(12) United States Patent
Jacquelin et al.

(10) Patent No.: US 8,873,809 B2
(45) Date of Patent: Oct. 28, 2014

(54) GLOBAL AND DENSE MOTION ESTIMATION

(75) Inventors: Frédéric Jacquelin, Paris (FR); Joël Budin, Paris (FR); Youssef Benchekroun, Paris (FR)

(73) Assignee: Sagem Defense Securite, Paris (FR)

( * ) Notice: Subject to any disclaimer, the term of this patent is extended or adjusted under 35 U.S.C. 154(b) by 20 days.

(21) Appl. No.: 13/519,944

(22) PCT Filed: Jan. 4, 2011

(86) PCT No.: PCT/FR2011/050010
§ 371 (c)(1),
(2), (4) Date: Jun. 29, 2012

(87) PCT Pub. No.: WO2011/080495
PCT Pub. Date: Jul. 7, 2011

(65) Prior Publication Data
US 2013/0142397 A1  Jun. 6, 2013

(30) Foreign Application Priority Data

Jan. 4, 2010 (FR) .................................... 10 50014

(51) Int. Cl.
| | |
|---|---|
| G06K 9/00 | (2006.01) |
| H04N 5/14 | (2006.01) |
| H04N 19/527 | (2014.01) |
| H04N 5/232 | (2006.01) |
| G06T 7/20 | (2006.01) |

(52) U.S. Cl.
CPC  *G06T 7/20* (2013.01); *H04N 5/144* (2013.01); *H04N 19/00593* (2013.01); *H04N 5/23254* (2013.01)
USPC ............ 382/107; 382/103; 382/209; 382/278

(58) Field of Classification Search
USPC .......... 382/103, 107, 209, 275, 278; 348/154, 348/155, 169
See application file for complete search history.

(56) References Cited

U.S. PATENT DOCUMENTS 7,109,482 B2 * 9/2006 Kley .............................. 250/306
7,158,570 B2 * 1/2007 Nagumo et al. ......... 375/240.16

(Continued)

FOREIGN PATENT DOCUMENTS

| EP | 1 117 251 A1 | 7/2001 |
|---|---|---|
| JP | 2009 290827 | 12/2009 |
| WO | WO-2004/056089 A1 | 7/2004 |

OTHER PUBLICATIONS

International Search Report for related International Application No. PCT/FR2011/050010; report dated Mar. 16, 2011.
Ewerth, et al.; *Segmenting Moving Objects in MPEG Videos in the Presence of Camera*; article; 2007; pp. 1-6.

(Continued)

*Primary Examiner* — Yosef Kassa
(74) *Attorney, Agent, or Firm* — Miller, Matthias & Hull LLP

(57) ABSTRACT

The invention relates to a method which uses a series of images sensed by an image sensor including at least one preceding image and one following image to estimate movement. A first estimated movement is initially obtained by estimating the total movement from the preceding image to the following image. Next, an image compensated according to the first estimated movement is obtained from either one of the preceding and following images. Then, a second estimated movement is obtained by estimating dense movement between the compensated image and the other from the preceding and following images. Next, a residual value of global movement is determined. Finally, if the residual value is lower than a threshold value the second estimated movement is provided; otherwise, the preceding steps are repeated. The first estimated movement is determined by applying a binary image mask, and if during step /e/ the steps /a/ to /e/ are repeated, said steps are performed by applying a binary image mask updated according to the second estimated movement.

11 Claims, 3 Drawing Sheets

(56) References Cited

U.S. PATENT DOCUMENTS

| | | | |
|---|---|---|---|
| 7,633,489 B2 * | 12/2009 | Lee et al. | 345/166 |
| 8,013,895 B2 * | 9/2011 | Helbing et al. | 348/208.4 |
| 8,040,382 B2 * | 10/2011 | Kahn et al. | 348/208.99 |
| 8,159,537 B2 * | 4/2012 | Itoh et al. | 348/155 |
| 8,289,401 B2 * | 10/2012 | Pinto et al. | 348/208.12 |
| 8,488,007 B2 * | 7/2013 | Robertson et al. | 348/208.4 |
| 8,508,605 B2 * | 8/2013 | Dolgin et al. | 348/208.4 |
| 8,570,344 B2 * | 10/2013 | Keating et al. | 345/633 |

OTHER PUBLICATIONS

Su, et al; *Global Motion Estimation From Coarsely Sampled Motion Vector Field and the Application*; magazine; 2005; vol. 15. No. 2; pp. 232-242.

Horn, et al; *Determining Optical Flow*; article; 1980; pp. 185-203; Artificial Intelligence Laboratory, Massachusetts Institute of Technology, Cambridge, MA.

Bruce David Lucas; *Generalized Image Matching by the Method of Differences*; book; 1985; pp. 1-152.

\* cited by examiner

GLOBAL AND DENSE MOTION ESTIMATION

CROSS-REFERENCE TO RELATED APPLICATIONS

This application is a 35 USC §371 U.S. national stage filing of International Patent Application No. PCT/FR2011/050010 filed on Jan. 4, 2011, which claims priority under The Paris Convention and 35 USC §119 to French Application No. 10 50014, filed on Jan. 4, 2010.

FIELD OF THE DISCLOSURE

The present invention relates to the field of image processing, and more particularly to the field of the estimation of motion within a sequence of captured images.

BACKGROUND OF THE DISCLOSURE

When a sequence of images is successively captured by a sensor as in particular in the case of a video, conventionally an estimation of inter-image global motion is carried out. This estimation of motion aims to determine the global motion affecting the image sequence between two successive images. It can correspond to the determination of the motion of the line of sight of the sensor used.

Such a global motion estimation allows in particular a stabilization of images to be implemented, or also denoising of images, or installing a super-resolution mechanism.

However, this type of mechanism can be substantially disturbed when the captured scene corresponds to one or more large objects that are mobile during the course of the sequence of captured images or also when the sequence of captured images has low contrast. Thus, in the latter case in particular, it is possible that the global motion estimation is in the end incorrect.

Some image processing systems rely on a sequential implementation of a global motion estimation and a dense motion estimation or also 'local motion estimation'.

A dense motion estimation consists of an estimation of motion at each point of the images of the captured sequence between two successive images. When a global motion estimation followed by a dense motion estimation are carried out sequentially, the latter estimation can be carried out on images that are compensated based on the preceding global motion estimation.

Then, the dense motion estimation makes it possible to calculate a residual motion at any point of an image. To this end, it is possible to rely on the fact that mobile objects have trajectories that vary slowly relative to the speed of acquisition of the images. This concatenation of the global motion estimation and the dense motion estimation can provide a high-performance estimation of motion in the case where the global motion estimation is itself reliable.

Conversely, when the global motion estimation is unreliable, motion estimation obtained in the end at the output of the subsequent dense motion estimation cannot be reliable and high-performance.

The invention aims to improve the situation.

SUMMARY OF THE DISCLOSURE

To this end, a first aspect of the invention proposes a motion estimation method in a series of images captured by an image sensor, said series of images including at least one preceding image and one following image;

said estimation method including the following steps:
/a/ obtaining a first estimated motion by carrying out a global motion estimation from the preceding image to the following image;
/b/ obtaining an compensated image based on a first estimated motion, starting from either one of the preceding and following images;
/c/ obtaining a second estimated motion by carrying out a dense motion estimation between the compensated image and the other one from the preceding and following images;
/d/ determining a global motion residual value (for example based on the second estimated motion); and
/e/ if the motion residual value is less than a threshold value, providing the second estimated motion, or otherwise, repeating steps /a/-/e/;
in which the first estimated motion is determined by applying a binary image mask; and
in which, if steps /a/ to /e/ are repeated in step /e/, they are carried out by applying a binary image mask updated as a function of the second estimated motion.

Steps /a/ to /e/ carried out the first time (before any repetition) can include a zero mask (masking nothing), or even no mask at all. Such an absence of masking can make it possible to improve the performance by avoiding a masking step (unnecessary when the latter includes a zero mask), at the cost of an optionally more complex implementation including a specific processing of the first iteration.

By the term 'preceding image' and 'following image' of a series of captured images is meant two images that follow chronologically in the series of images in question. These two sequential images can be consecutive or even spaced apart by one or more intermediate captured images. No limitation is placed on the spacing between the preceding image and the following image considered herein.

By the term 'global motion estimation' is meant an estimation of motion mechanism making it possible to represent the motion affecting the series of captured images between a preceding image and a following image in a global manner. This global motion can correspond to an estimation of the motion of the line of sight of the sensor used. The global motion can also correspond, for example, to the motion, in three dimensions of rotation and three dimensions of translation, of a camera incorporating an image sensor, with respect to a scene filmed by said camera. No limitation is placed on the type of estimation mechanism used herein. The Lucas-Kanade method, published in 1984 in the thesis "Generalized image matching by the method of differences" and originally used for estimating dense motion, can be capable of global motion. It consists of determining a limited number of parameters (translation, roll motion, zoom, etc.) by least-square solution of the equation of the apparent motion over significant points of the image.

By the term 'compensated image' is meant a captured image that has been compensated based on the estimated global motion. The compensated image can thus correspond, for example, to the estimation of a following image, as a function of a preceding image and an estimation of a global motion between the preceding image and the following image. In this case, the compensated image is not necessarily identical to the following image, as the estimation of the global motion does not necessarily allow the following image to be accurately derived from a preceding image. For example, the estimation of the global motion in general gives an indication of average motion typically does not take account of the mobile elements optionally situated within a filmed scene. The position of these mobile elements in the compensated image can therefore be incorrect.

By the term 'dense motion estimation' is meant an estimation of motion mechanism making it possible to represent the motion affecting the series of captured images between a preceding image and a following image, in a partial manner within the image. In other words, such an estimation mechanism makes it possible to provide motion vectors for each portion of the image, with more or less precision. An estimation of an image motion can thus be provided at each image point for example. A scene can be divided into different portions, each corresponding to a particular element of the scene. Each portion can correspond to the smallest element of the image (point, also called pixel). But a portion can also correspond to a particular shape present in the image. It is possible for example to recognize objects, such as motor cars, on series of images captured by a highway radar device. Each motor car can then correspond to an image portion. In two successive images, these portions are not necessarily superimposable (even in the absence of global motion) since the respective motions of the different portions are not necessarily the same. In other words, the relative positions in a first image and a second image of two portions of the scene are not necessarily the same (for example the two portions can be further apart in the first image than in the second). Portions of the scene can disappear (for example when they leave the image field), others can appear. It is possible to define the different portions using a grid pattern of the image, for example a regular grid pattern in the form of small rectangles. An image portion can then correspond to a sub-set of rectangles having common motion characteristics (for example a dense motion greater than a particular threshold for this portion).

This type of estimation of motion ('dense motion estimation') provides a second estimated motion making it possible to represent in particular the motion of mobile objects that could traverse the images of the series of captured images. Among the conventional methods given in the literature, the Lucas-Kanade and Horn-Schunck methods are known in particular. The first method consists of a least-squares solution to the equation of the apparent motion in a local window. The second method, extracted from the article "Determining optical flow" (1981), consists of a minimization of functionals a data-consistent term of which corresponds to the square of the equation of the apparent motion, and a regularization term is the square of the local variation of the field.

The second estimated motion can correspond to a triplet of values for each image portion (or each image point): a value for a translation vector in a first direction U, a value for a translation vector in a second direction V, as well as an associated reliability value N. Thus, the second estimated motion corresponds to a set of estimated sub-motions for each image portion in the image sequence. For example, this second estimated motion measures a dense motion between the compensated image and the actual image, which is advantageous as this allows efficient measurement of the motion residual value making it possible (if appropriate) to efficiently converge the possible iterations into a relevant global motion estimation.

By the term 'motion residual value' is meant a measurement relating to the residual global translation, i.e. which is always present at the output of step /c/. This motion residual value can be determined for example by calculating an average of this translational motion over all the points of the image for which U and V values are held, the reliability N of which exceeds a threshold.

Such a estimation method proposes not only to carry out sequentially a global motion estimation followed by a dense motion estimation during a series of steps /a/-/e/, but it proposes moreover that this series of steps is iterative. Thus, this estimation method is an iterative method that ensures a particular determined quality level.

Using these provisions, it is possible to combine both a global motion estimation mechanism and a dense motion estimation mechanism in a manner that is easy and gives high performance. Advantageously, such a combination of these two types of motion estimation provides relevant results even if the first estimated motion is unreliable during some iterations of the series of steps.

It is possible that some portions of the captured images have characteristics that do not allow a relevant motion estimation to be achieved. Advantageously, it is provided to apply a binary mask to the following iteration in order to take account of only those points of the image making it possible to provide relevant information for the following iteration. Thus, it is possible to achieve a reliable method that converges rapidly. A mask can be used for example to disregard the portions of the compensated image (and of the image to which the compensated image is compared) corresponding to mobile elements of the filmed scene.

Thus, it can be advantageous not to take such image portions into consideration. Thus, in an embodiment, it is provided to apply a binary image mask to one of the images in question, so as to take account of only those image portions that are relevant for motion estimation. In this case, the first estimated motion, corresponding to a global motion, is determined by applying a binary image mask. Then, if in step /e/ it is decided to repeat steps /a/-/e/, then these steps are carried out by applying a binary image mask that is updated as a function of the second estimated motion.

In this context, this binary image mask can be initialized to 0 for the first iteration of the series of steps of the method, i.e. no image portion is masked initially. Then, at the end of each iteration of the series of steps, it is then possible to update this binary image mask based on the second estimated motion obtained. Thus, in the following iteration, the updated binary image mask can be applied in order to obtain a reliable global motion estimation. Thus, advantageously, it is provided herein to apply to the global motion estimation a binary image mask that is updated based on the dense motion estimation. By means of this procedure, it is possible to incorporate, within the global motion estimation mechanism, information originating from the dense motion estimation mechanism. This combination of the iterative mechanisms provides reliable results, while remaining simple to apply.

The binary mask can be produced as follows: a motion residual value is calculated over the set of points where the dense estimation calculation is carried out. Then, the binary mask gives the value 1 for the points at which the dense motion departs from said calculated residual value by more than a determined threshold value.

In an embodiment of the present invention, if steps /a/-/e/ are repeated, they are applied to the same preceding and following images. Thus, the series of steps is repeated on the same images until the quality threshold level is reached.

In this case, in step /b/, the compensated image can advantageously be obtained by compensating the following image on the preceding image based on the first estimated motion; and in step /e/, the updated binary image mask can be a mask to be applied to the preceding image.

Here, compensation of one of the following and preceding two images is carried out chronologically since a following image must be compensated on an image that precedes it.

Thus, advantageously, the updated binary image mask in this context can be applied directly to the preceding image during the following iteration of the series of steps.

It can be advantageous to provide more rapid implementation of such a motion estimation method. Thus, in an embodiment of the present invention, hereinafter referred to as the 'rapid mode', if steps /a/-/e/ are repeated, at each repetition, they are applied while considering the following image of the preceding iteration as preceding image and considering an image that follows said following image of the preceding iteration as the following image.

By means of this procedure, advantageously the successive iterations of the series of steps are applied on a different preceding image and following image pair. In fact, it is provided herein to apply the following iteration to the old following image, which is then considered to be the preceding image, and to an image that follows it in the sequence of captured images, which is then considered to be the following image.

This embodiment is advantageously capable of real-time applications that require rapid processing.

In this context, advantageously, it can be provided that, in step /b/, the compensated image is obtained by compensation of the preceding image on the following image based on the inverse of the first estimated motion. It is possible here to then obtain an updated binary image mask, which is a mask to be applied directly to the following image of the next iteration.

By means of this procedure, an image is compensated anti-chronologically. In this case, advantageously, the updated binary image mask can be a mask to be applied to the following image of the iteration in progress, which becomes the preceding image in the following iteration. As a result of this anti-chronological mechanism, the application of the method is significantly simplified in a rapid mode.

A second aspect of the present invention proposes an image processing device including means for implementing a motion estimation method according to the first aspect of the present invention.

A third aspect of the present invention proposes a computer program including instructions for implementing the method according to the first aspect of the present invention, when this program is executed by a processor.

A fourth aspect of the present invention proposes a recording medium on which the computer program according to the third aspect of the present invention is stored.

BRIEF DESCRIPTION OF DRAWINGS

Yet further features and advantages of the invention will become apparent on reading the following description. This is purely illustrative and must be read with reference to the attached drawings in which.

DETAILED DESCRIPTION OF THE DISCLOSURE

Figure 1:
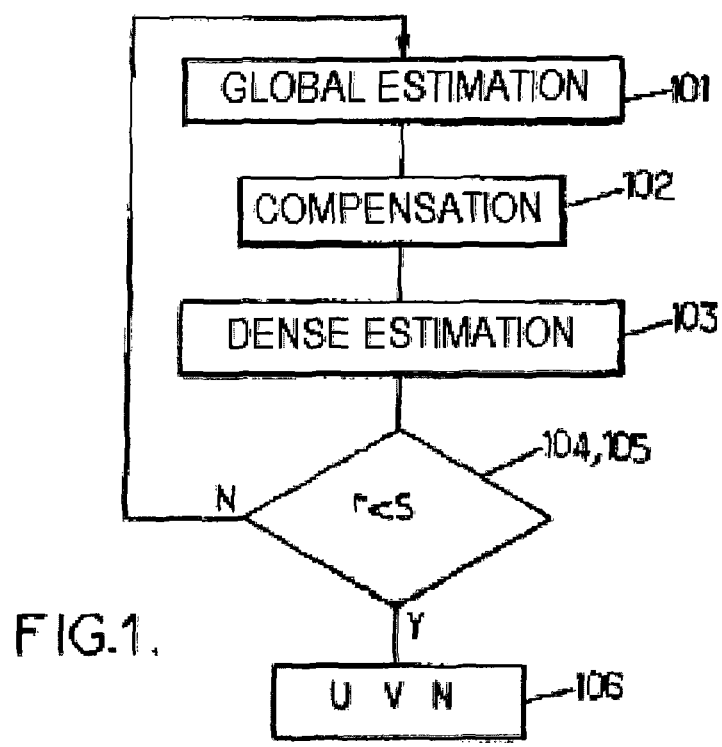
FIG. 1 shows the main steps of a motion estimation method according to an embodiment of the present invention.

FIG. 1 shows the main steps of the motion estimation method according to an embodiment of the present invention;

Here a series of images li is considered, for integer i comprised between 1 and N. This series of images comprises at least one preceding image $I_{n-1}$ and one following image $I_n$.

In a step 101, a first estimated motion H is obtained by carrying out a global motion estimation from the preceding image $I_{n-1}$ to the following image $I_n$. This first estimated motion can be represented in the form of a homographic compensation matrix H.

Then, in a step 102, a compensated image or $I'_{n-1}$ or $I'_n$, based on the first estimated motion is obtained, respectively from the preceding image $I_{n-1}$ or from the following image $I_n$. Then, in a step 103, a second estimated motion is obtained by carrying out a dense motion estimation between the compensated image and the other one from the preceding and following images. Thus, it is envisaged to compensate the preceding image and to estimate a dense motion between the compensated image and the following image. It can also be envisaged to compensate the following image and to estimate a dense motion between the compensated image and the preceding image. At the output of this step, respective values are available for different image portions for a first translation vector U, for a second translation vector V and for an associated reliability factor N.

Then, in a step 104, a global motion residual value r is determined based on an average calculated on the set of the calculation points of the dense field U and V for which the reliability N is greater than a threshold value.

Finally, in a step 105, if the residual value r is less than a threshold value S, the second estimated motion is provided during the current iteration in a step 106, otherwise steps 101-105 are repeated.

Throughout the following sections, it is provided to implement the method with the application of a binary image mask. However, it is easy to derive therefrom an application in which the binary image mask is not used.

Figure 2:
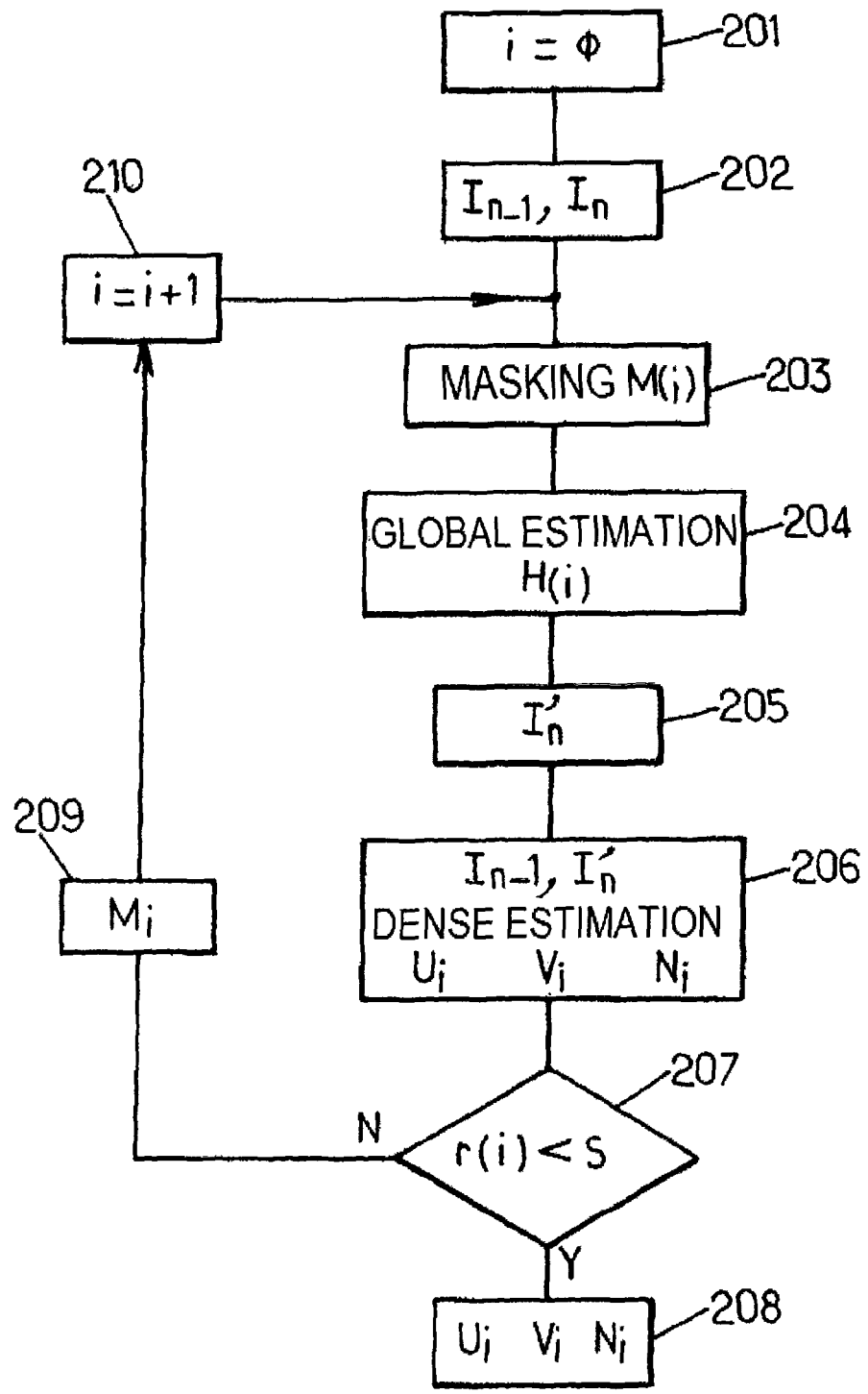
FIG. 2 shows an implementation of an estimation method according to an embodiment of the present invention.

FIG. 2 shows an implementation of the present invention according to an embodiment of the present invention.

Generally, it is proposed herein to implement a global motion estimation followed by a dense motion estimation in an interleaved iterative manner, each iteration being applied on two of the same images until a determined quality level is reached.

It should be noted that advantageously, in this embodiment, the present invention implements a binary image mask M, cleverly avoiding taking account of information relating to some portions of the image. The binary image mask initially gives the value zero relative to each portion of the image. Thus, the binary image mask initially applied makes it possible to take account of the image globally at initialization. The binary image mask is here updated at each new iteration. It is therefore referenced M(i).

A matrix allowing the global motion of the image to be modelled is referenced H. This matrix H can in particular show a first and a second translation representing the global motion in a first and a second respective direction. This matrix $H_{n-1, n}$ allows an image $I_n$ to be homographically compensated on a image $I_{n-1}$.

The following steps are applied iteratively to two of the same images captured successively, the first captured image being referenced $I_{n-1}$ and the following captured image being referenced $I_n$.

In a step 201, the iteration index i is initialized to the value 0. It is provided moreover for M(0) to be a zero binary image mask, i.e. no point of the image is masked during the first iteration of the steps of the procedure.

Then, in a step 202, the two images and $I_{n-1}$ and $I_n$ that succeed each other in the sequence of captured images are thus selected. In a step 203 of the iteration i, the mask M(i) is applied to image $I_{n-1}$. Then, in a step 204, an estimate of global motion of $I_{n-1}$ to $I_n$ is carried out. This global motion estimation is represented via the homographic compensation matrix H(i).

Then in a step 205, image $I_n$ is compensated on $I_{n-1}$ based on the compensation matrix H (i). At the output of this step 205 a compensated image $I_n'$ is obtained.

Then on the basis of this compensation, i.e. using images $I_{n-1}$ and $I_n'$, in a step 206, a dense motion estimation is carried out, i.e. for example, a value for the translation vector U and a translation value are determined, as well as a reliability value N for these vector values at each point of image $I_{n-1}$.

In a step 207, based on these values of U, V and N, a calculation of the global residual motion value r is carried out, and this value is compared with a threshold value S. In the case where the residual motion r is less than the threshold value S, then the steps are not repeated and the last second estimated motion is provided in a step 208. Two further images from the sequence of captured images can then be taken into consideration and applied to this same procedure.

In the case where the residual motion is greater than the threshold value S, in a step 209, the binary image mask M(i) is updated based on the second estimated motion.

Then, in a step 210, the iteration index is incremented by the value 1 and the steps previously described are again carried out on the same images $I_{n-1}$ and $I_n$.

Figure 3:
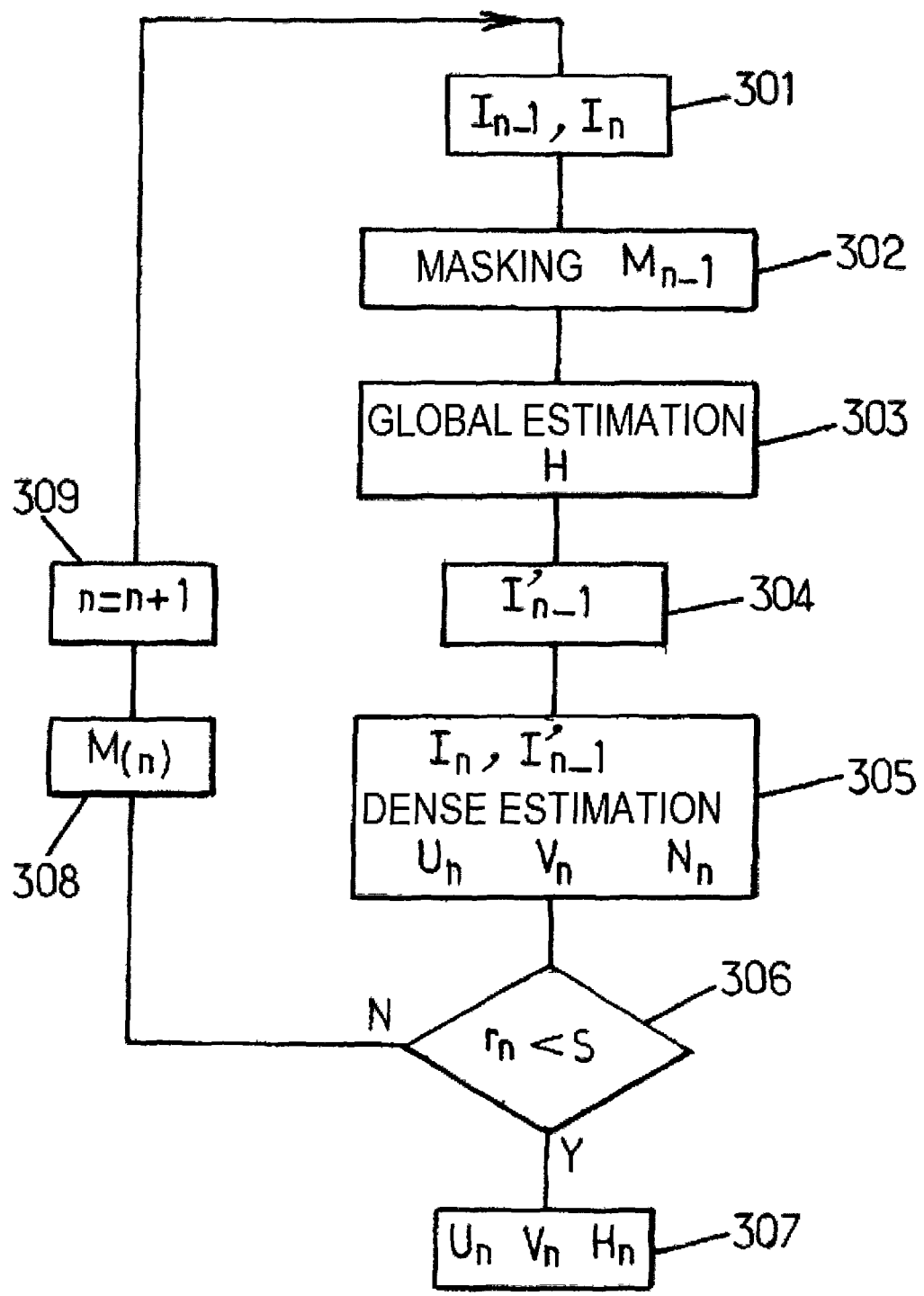
FIG. 3 shows a further implementation of an estimation method according to an embodiment of the present invention.

FIG. 3 shows a further implementation of the present invention according to an embodiment thereof. Generally, it is also proposed herein to carry out a global motion estimation followed by a dense motion estimation in an interleaved iterative manner. However, in the present context, each iteration is applied on two different successive images. More precisely, in a preceding iteration, it is provided to apply a processing to a first and a second successive images, then in a following iteration, this same processing is applied to this second image and to an image that follows the second image in the sequence of captured images.

This method according to an embodiment of the present invention is applied to a sequence of captured images $I_i$ for integer i comprised between 1 and N. The first iteration of the series of steps of the processing method is here applied to images $I_1$ and $I_2$. The second iteration of the series of steps is applied to images $I_2$ and $I_3$. The first binary image mask applied is a zero mask.

Next, the following section describes in general terms an iteration applied to successive images in the captured sequence $I_{n-1}$ and $I_n$.

Thus, in a step 301, the two images $I_{n-1}$ and $I_n$ are taken into consideration. Then, in a step 302, a binary image mask M(n−1) is applied to image $I_{n-1}$ The application of this mask makes it possible to take into consideration within image $I_{n-1}$ only the points that are useful with respect to the motion estimation procedure. Then, in a step 303, a global motion estimation is carried out on the two images $I_{n-1}$ and $I_n$ on the basis of which a global motion homography matrix H of the motion from image $I_{n-1}$ to $I_n$ is determined.

It is cleverly provided herein to process the images anti-chronologically. This mechanism can prove to be very relevant in some video processing applications in particular. It is provided herein to determine an image compensated from image $I_{n-1}$ in order to be able to carry out a dense motion estimation from image $I_n$ to the compensated image $I'_{n-1}$. By proceeding in this way, advantageously a binary image mask M(n) can be determined for direct application to image $I_n$ during the next iteration. Image $I_n$ will be considered to be the preceding image in the next iteration. As a result, the next iteration can be applied to image $I_n$ and the following image $I_{n+1}$ with the binary image mask M(n) directly capable of application to image $I_n$.

To this end, a global motion homography matrix can be determined for application to image $I_{n-1}$ for its compensation on image $I_n$. This matrix corresponds to 1/H, i.e. the inverse of the homography matrix H.

In a step 304, the image is then obtained by applying the homography matrix 1/H.

Then, in a step 305, a dense motion estimation is carried out from image $I_n$ to the compensated image $I'_{n-1}$. At each point of image $I_n$ a value of the motion vector $U_n$, a value of the motion vector $V_n$, and an associated reliability value $N_n$, relative to image $I_n$ are derived therefrom. Based on these values, a global residual motion value $r_n$ relative to image $I_n$ is derived. Thus, in a step 306, this residual motion value $r_n$ is compared with a quality threshold value S. If the reliability value $r_n$ is less than the value S, then the series of steps is not repeated and the estimation procedure provides at output the following variables:

$U_n$,
$V_n$,
H

Conversely, in step 308, a binary image mask M(n−1) is determined to enable its application to the preceding image of the next iteration, this image corresponding to the image $I_n$ of the preceding iteration. Then, in a step 309, the index n is incremented by the value 1.

Advantageously here, the binary image mask M obtained before the next iteration of the series of steps is directly applicable to image $I_{n-1}$ because it is determined based on information relating to an anti-chronological direction in the sequence of captured images. In fact, the values of U, V and N provided by the dense motion estimation step are determined on a comparison from image $I_n$ to image $I_{n-1}$, i.e. by considering the two images in an anti-chronological direction with respect to their order in the sequence of captured images.

Figure 4:
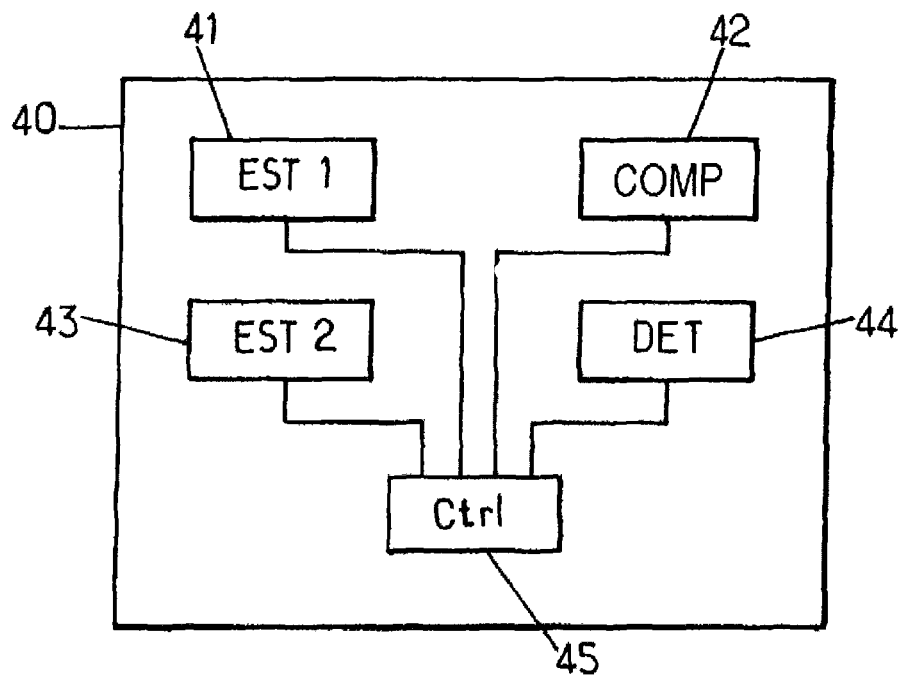
FIG. 4 shows a processing device including means capable of implementing a method according to an embodiment of the present invention.

FIG. 4 shows an image processing device capable of implementing a procedure according to an embodiment of the present invention. Such a device can advantageously correspond to an on-board electronic card.

Such a device includes:

a first estimation unit 41 capable of obtaining a first estimated motion by carrying out a global motion estimation from the preceding image $I_{n-1}$ to the following image $I_n$;

a compensation unit 42 capable of obtaining a compensated image $I'_{n-1}$ or $I'_n$ based on the first estimated motion, from either one of the preceding and following images $I_{n-1}$, $I_n$;

a second estimation unit 43 capable of obtaining a second estimated motion U, V, N by carrying out a dense motion estimation between the compensated image and the other one from the preceding and following images;

a determination unit 44 capable of determining a global residual motion value r; and a control unit 45, capable, on the one hand, of starting a sequence of steps by sequentially controlling the first estimation unit, the compensation unit, the second estimation unit and the determination unit and, on the other hand, of deciding if the residual value is less than a threshold value S to provide the last-provided second estimated motion U, V, N, and otherwise of starting said sequence of steps again.

The first estimation unit 41 can take account of a binary image mask M; and the determination unit 43 can be capable of updating the binary image mask as a function of the second estimated motion.

If the sequence of steps is started again, the steps can be applied to the same preceding and following images.

In an embodiment, the compensated image can be provided by the compensation unit 42 by compensation of the following image $I_n$ on the preceding image $I_{n-1}$ based on the first estimated motion; and the determination unit 43 can provide the updated binary image mask as the mask to be applied to the preceding image.

In a variant, if steps /a/-/e/ are repeated, at each repetition they are applied considering the following image of the preceding iteration as the preceding image and considering an image that follows said following image of the preceding iteration as the following image.

In this case, the compensated image $I'_{n-1}$ can be provided by the compensation unit 42 by compensation of the preceding image $I_{n-1}$ on the following image $I_n$ based on the inverse of the first estimated motion; and the determination unit 43 can provide the updated binary image mask as the mask to be applied to the following image of the next iteration.

The invention claimed is:

1. A method for the estimation of motion in a series of images captured by an image sensor, said series of images including at least one preceding image and one following image;
said estimation method including the following steps:
/a/ obtaining a first estimated motion by carrying out a global motion estimation from the preceding image to the following image;
/b/ obtaining a compensated image based on the first estimated motion, from either one of the preceding and following images;
/c/ obtaining a second estimated motion by carrying out a dense motion estimation between the compensated image and the other one from the preceding and following images;
/d/ determining a global motion residual value; and
/e/ if the residual value is less than a threshold value providing the second estimated motion, otherwise repeating steps /a/-/e/;
in which the first estimated motion is determined by applying a binary image mask; and
in which, if in step /e/ the steps /a/ to /e/ are repeated, they are carried out by applying a binary image mask updated as a function of the second estimated motion.

2. The motion estimation method according to claim 1, in which, if steps /a/-/e/ are repeated, they are applied to the same preceding and following images.

3. The motion estimation method according to claim 2, in which, in step /b/, the compensated image is obtained by compensation of the following image on the preceding image based on the first estimated motion; and
in step /e/, the updated binary image mask is a mask for application to the preceding image.

4. The motion estimation method according to claim 1, in which, if steps /a/-/e/ are repeated, at each repetition they are applied considering the following image of the preceding iteration as the preceding image and considering an image that follows said following image of the preceding iteration as the following image.

5. The motion estimation method according to claim 4, in which, in step /b/, the compensated image is obtained by compensation of the preceding image on the following image on the basis of the inverse of the first estimated motion; and in which the updated binary image mask is a mask for application to the following image of the next iteration.

6. A non-transitory computer readable storage medium storing a computer program comprising instructions which, when executed by a processor, cause the processor to execute a method according to claim 1.

7. A device for processing images from a series of images captured by an image sensor, said series of images including at least one preceding image and one following image;
said image processing device including:
a first estimation unit capable of obtaining a first estimated motion by carrying out a global motion estimation from the preceding image to the following image;
a compensation unit capable of obtaining a compensated image based on the first estimated motion, from either one of the preceding and following images;
a second estimation unit capable of obtaining a second estimated motion by carrying out a dense motion estimation between the compensated image and the other one from the preceding and following images;
a determination unit capable of determining a global motion residual value; and
a control unit, capable on the one hand, of starting a sequence of steps by sequentially controlling the first estimation unit, the compensation unit, the second estimation unit and the determination unit and, on the other hand, of deciding if the residual value is less than a threshold value to provide the last-provided second estimated motion, and otherwise of starting said sequence of steps again;
in which the first estimation unit takes account of a binary image mask; and in which the determination unit is capable of updating the binary image mask as a function of the second estimated motion.

8. The processing device according to claim 7, in which, if the sequence of steps is started again, they are applied to the same preceding and following images.

9. The processing device according to claim 8, in which the compensated image is provided by the compensation unit by compensation of the following image on the preceding image based on the first estimated motion; and
in which the determination unit provides the updated binary image mask as the mask to be applied to the preceding image.

10. The processing device according to claim 7, in which, if steps /a/-/e/ are repeated, at each repetition, they are applied considering the following image of the preceding iteration as preceding image and considering an image that follows said following image of the preceding iteration as the following image.

11. The processing device according to claim 10, in which the compensated image is provided by the compensation unit by compensation of the preceding image on the following image based on the inverse of the first estimated motion; and
in which the determination unit provides the updated binary image mask as the mask to be applied to the following image of the next iteration.

* * * * *